Aug. 8, 1961

O. K. KELLEY ET AL 2,995,215

PARKING BRAKE ACTUATING MECHANISM

Filed Nov. 10, 1958

INVENTORS
Oliver K. Kelley
BY Gilbert K. Hause

D. E. Staley

Their Attorney

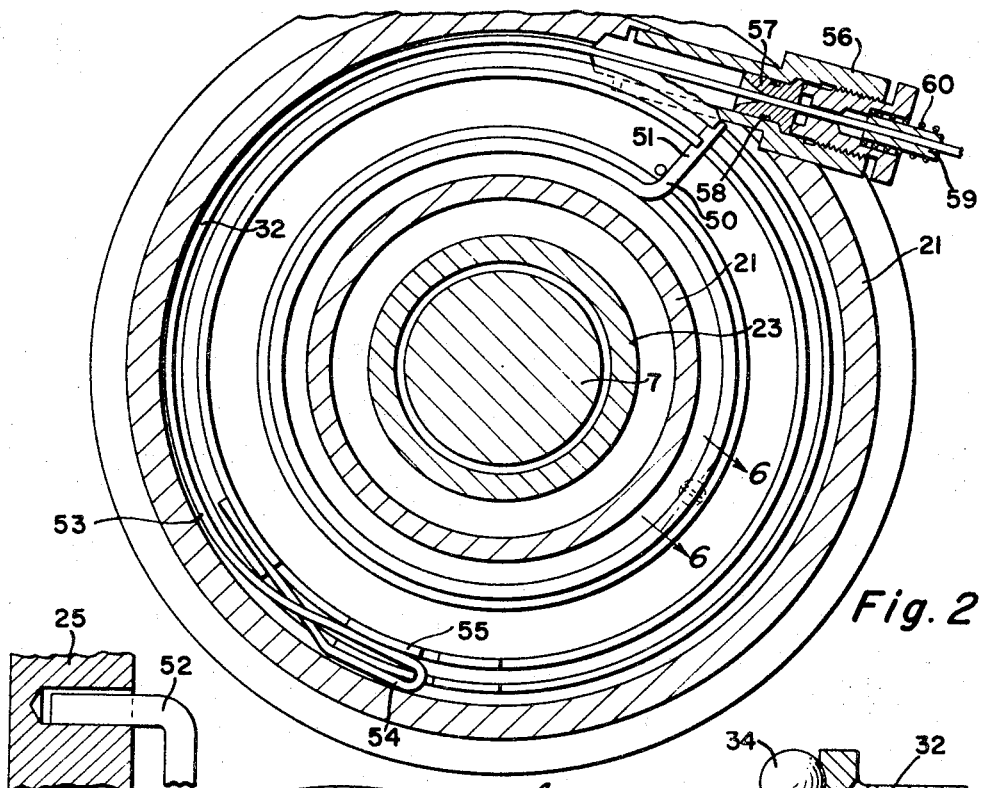
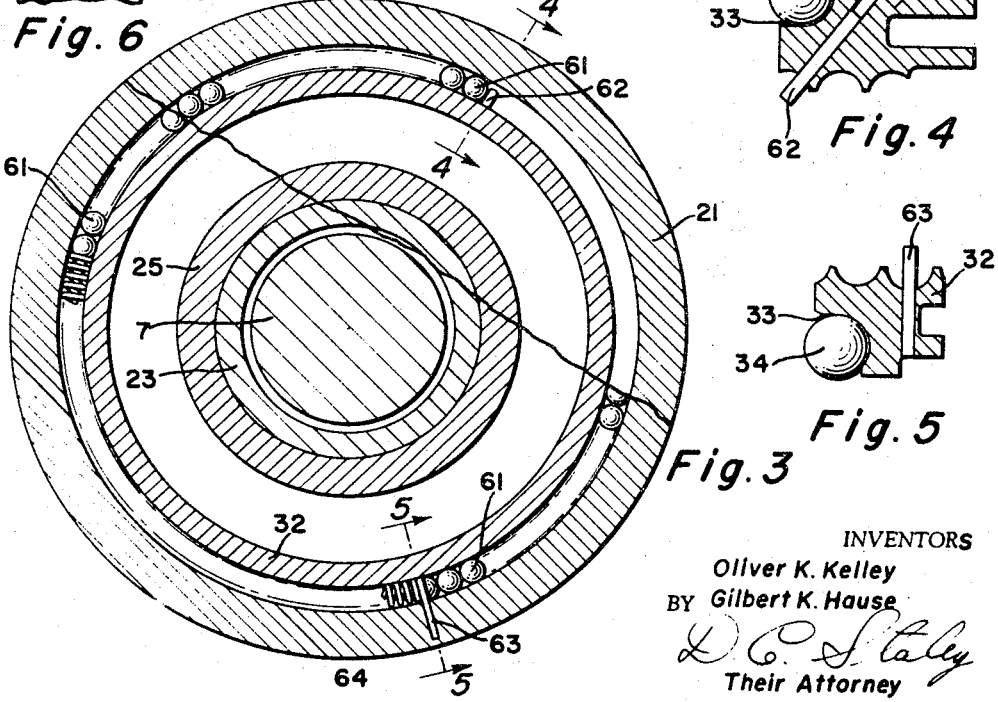

INVENTORS
Oliver K. Kelley
Gilbert K. Hause
BY
Their Attorney

United States Patent Office 2,995,215
Patented Aug. 8, 1961

2,995,215
PARKING BRAKE ACTUATING MECHANISM
Oliver K. Kelley and Gilbert K. Hause, Bloomfield Hills, Mich., assignors to General Motors Corporation, Detroit, Mich., a corporation of Delaware
Filed Nov. 10, 1958, Ser. No. 772,977
3 Claims. (Cl. 188—72)

This invention relates to a vehicle disk brake and more particularly to a parking brake actuating mechanism for a vehicle disk brake.

One of the problems of operating a parking brake in conjunction with a vehicle disk brake has been in providing a parking brake which provides adequate braking after the friction disks have cooled. If the brake disks have been in operation for a considerable time prior to application of the parking brake, they have a certain amount of axial expansion due to the heating of the brake disks. With the close tolerances employed between the friction disks, the changing from a hot to a cool temperature is sometimes sufficient to release the braking effect provided by the parking brake.

It has been difficult to provide a braking mechanism within the limited space usually present in a vehicle disk type of brake. The parking brake must operate within this limited space and yet provide adequate braking under all conditions.

It is an object of this invention to provide a parking brake which operates in conjunction with a hydraulically operated vehicle disk brake.

It is another object of this invention to provide a parking brake with a sufficiently high mechanical advantage to give sufficient axial compression of the disk stack in a vehicle disk brake to provide adequate braking under all conditions.

It is a further object of this invention to provide a ball groove nut and ball groove sleeve which is cable operated to provide axial elongation for the actuation of a parking brake operating in conjunction with a vehicle disk brake.

It is a further object of this invention to provide a cable operated ball groove nut and ball groove sleeve mechanism for axial elongation and operation of a vehicle disk brake. In conjunction with this type of parking brake, it is further intended that this type of mechanism should operate with a hydraulic annular piston which is used for actuation of the regular braking means.

It is a further object to provide a means for adjusting the clearance between the brake disks automatically during the braking cycle. This automatic adjustment is provided by movable members which have a close fitting tolerance with the annular hydraulic piston where they are fitted into the piston.

These objects are accomplished by a vehicle parking brake actuating mechanism which operates in conjunction with the vehicle disk brake. The vehicle disk brake is actuated by an annular hydraulic piston. This hydraulic piston operates as a ball groove sleeve when actuated by the parking brake mechanism. A ball groove nut is placed concentrically with the annular piston with a mating helical ball groove which is cut partially within the nut and partially in the piston sleeve. The ball groove nut is rotated by means of a cable. Spherical balls are inserted in the helical ball groove and resiliently held in position by springs. As the ball groove nut is rotated in relation to the ball groove piston sleeve, the two members elongate axially in relation to each other. These two members being combined in an enclosure with the piston sleeve abutting the braking disks, and the brakes are actuated when the mechanism is elongated.

To give added assistance to the actuation of the parking brake, the hydraulic brakes may also be actuated and thereby providing greater compression of the brake disk stack. With the added pressure created on the disk stack, the releasing of the brakes upon cooling of the brake disks is quite unlikely.

An added feature is incorporated in this braking structure whereby an automatic clearance adjustment is built into the braking mechanism. This clearance is provided by a closely fitted member projecting into the annular piston. The member moves through a flange in the piston during brake actuation and has a clearance between the housing and the member equal to the clearance between the brake disks. The retraction springs return the piston so the member rests on the housing. The member slides through the annular piston at a rate equal to the wear on the disk stacks.

Further objects and advantages of the present invention will be apparent from the following description, reference being had to the accompanying drawings wherein a preferred embodiment of the present invention is clearly shown.

FIG. 2 is a cross-section view taken on line 2—2 of FIG. 1. This view shows the end portion of the parking brake actuating means and the cable connection.

Figure 1:
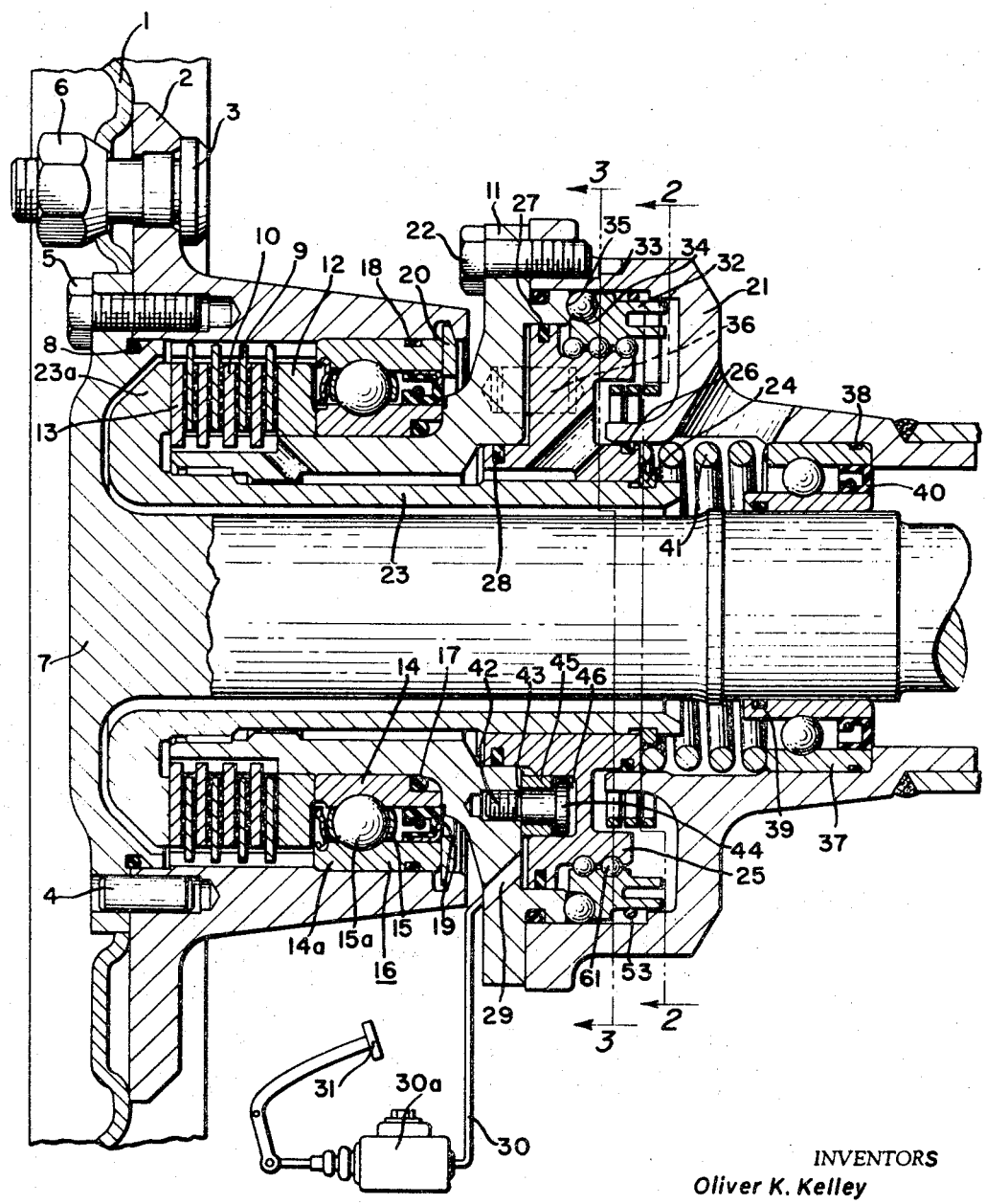
FIG. 1 is a cross-section view of the vehicle disk brake in a vertical plane through the center line of the wheel axle. This view also shows a parking brake actuating means.

FIG. 3 is a cross-section view taken on line 3—3 of FIG. 1. This view shows a central portion of the parking brake actuating means and the means for retaining the spherical balls. A portion of the view is cut away for clarification of the parts.

FIG. 4 is a cross-section view taken on line 4—4 of FIG. 3.

FIG. 5 is a cross-section view taken on line 5—5 of FIG. 3.

FIG. 6 is a cross-section view taken on line 6—6 of FIG. 2.

Figure 7:
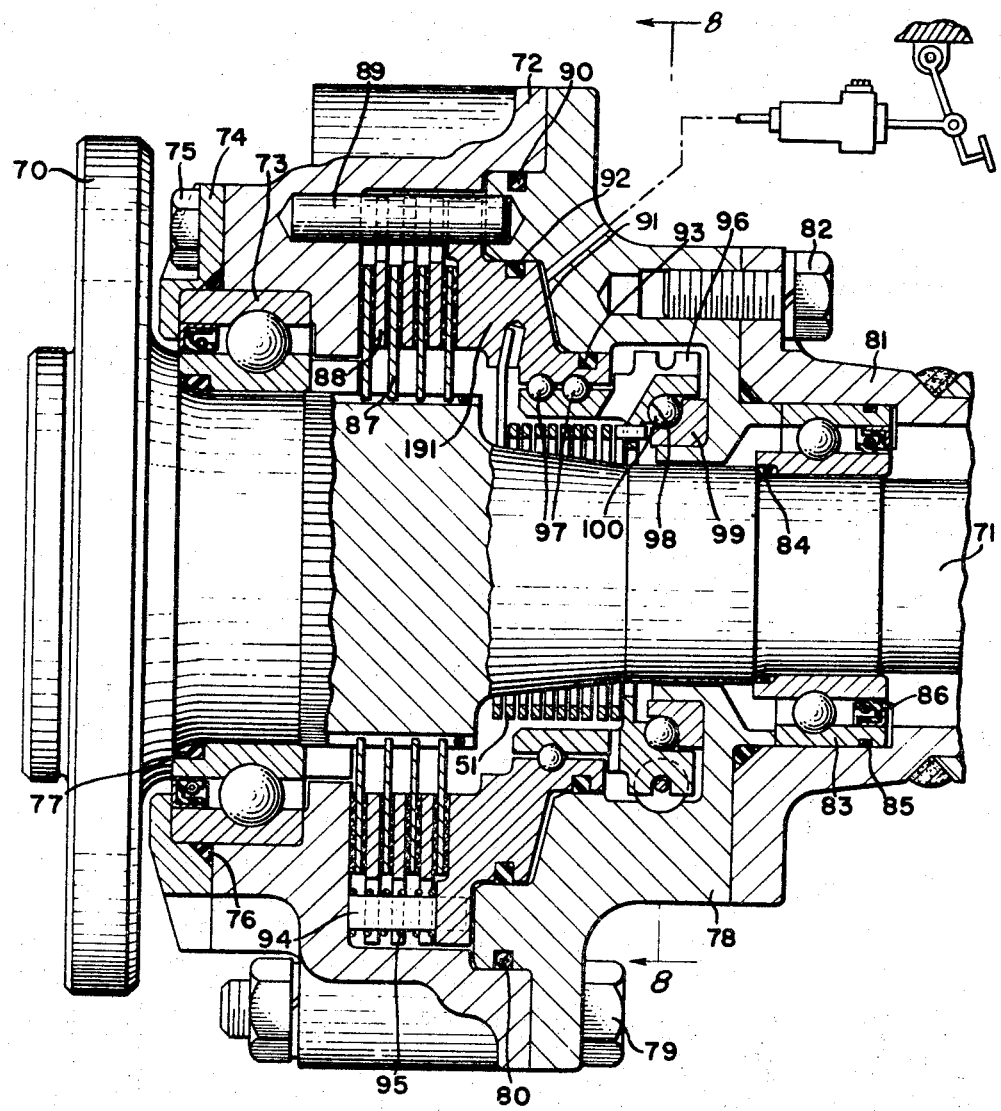

FIG. 7 is a cross-section view of a modified version of the vehicle disk brake and parking brake actuating mechanism. The view is taken on a plane vertically through the center line of the wheel shaft.

Figure 8:
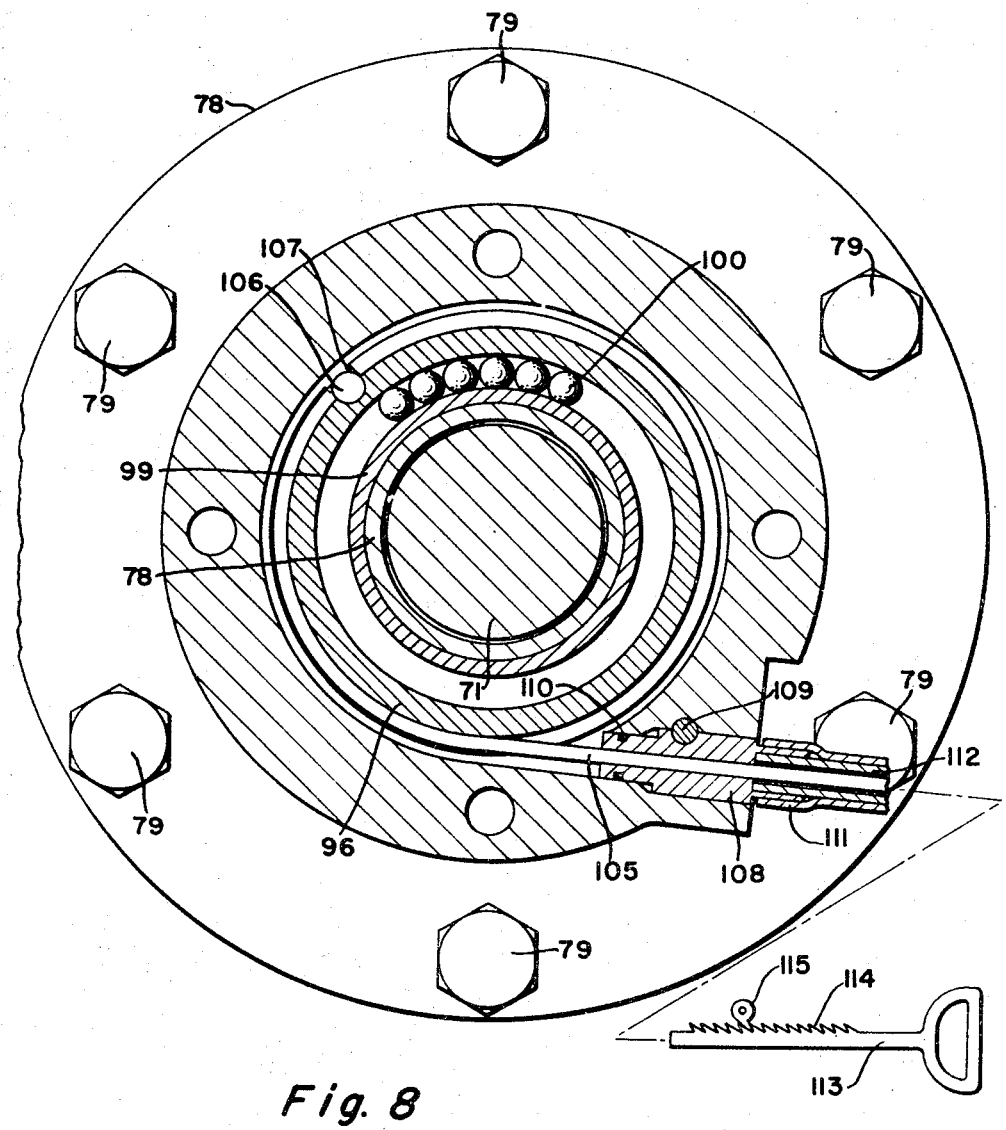

FIG. 8 is a cross-section view taken on line 8—8 of FIG. 7 showing the mounting of the cable, and the spherical ball members between the ball groove nut and the ball groove sleeve member.

Figures 9, 10, 11:
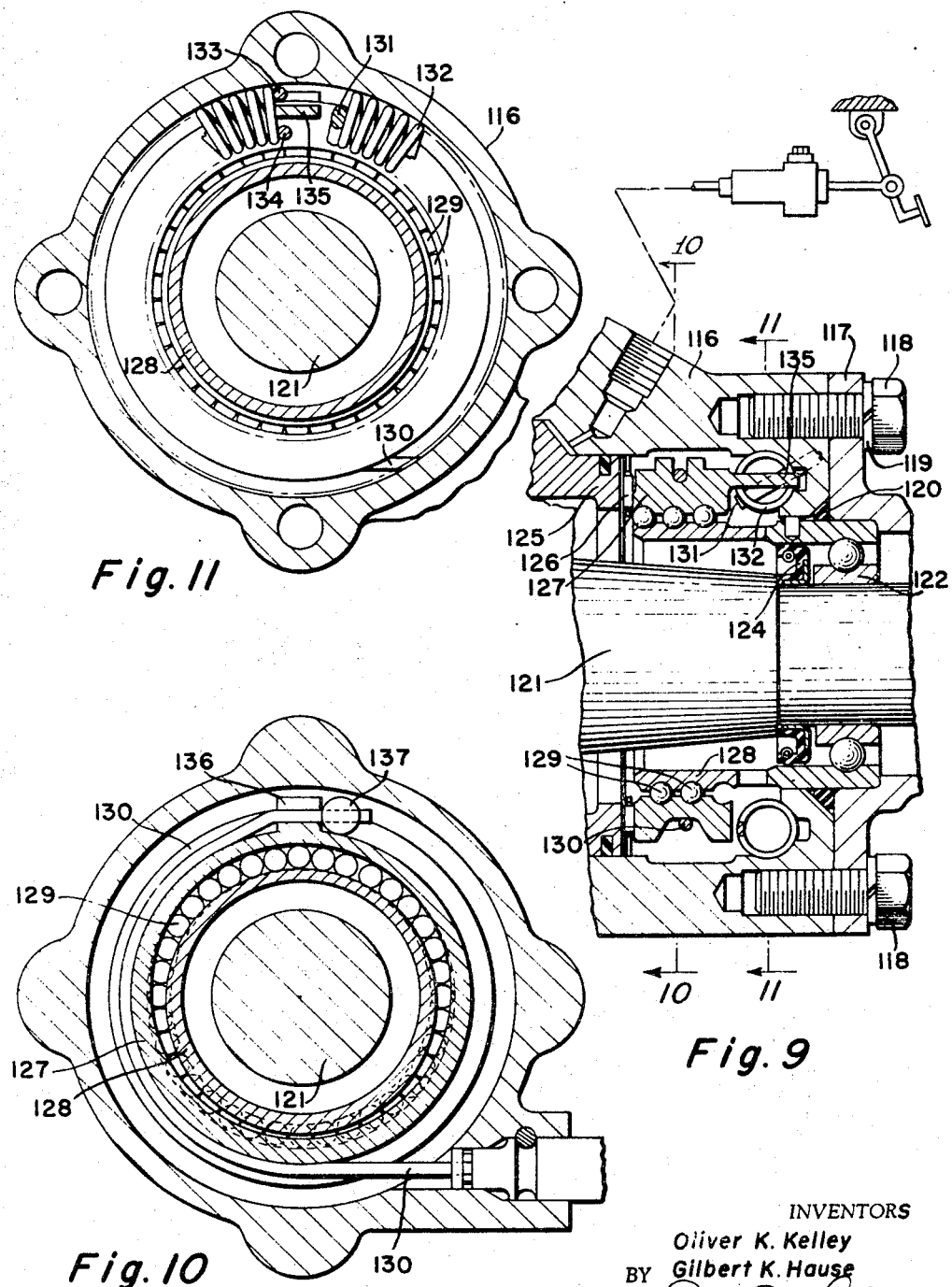

FIG. 9 is a cross-section view of another modification of the emergency brake actuating means.

FIG. 10 is a cross-section view taken on line 10—10 of FIG. 9.

FIG. 11 is a cross-section view taken on line 11—11 of FIG. 9.

FIG. 1 illustrates the braking structure and the parking brake actuating means. The cross-section of the wheel is shown at 1 which is bolted to the wheel hub 2 by means of bolts 3 and nuts 6. An integral flange of the wheel shaft 7 is aligned by means of the dowel pins 4 and connected to the hub portion 2 by means of bolts 5. The wheel shaft 7 extends through the internal portion of the brake structure and the parking brake actuating means. The hub section 2 forms a housing around the outer periphery of the brake disks. A seal 8 is provided between the hub 2 and the flange of shaft 7. The rotating disks 9 are mounted on a spline connection on the internal periphery of the hub 2. The rotating disks 9 are alternately spaced between stator disks 10. The stator disks 10 are mounted on the outer periphery of the shaft housing 11 by means of a spline connection. The rotating disks 9 carry a friction material which engages the stator disks 10. Inboard of the braking disks 9 and 10 is mounted a backing plate 12. On the outboard side of the braking disks 9 and 10 is mounted a pressure plate 13.

A ball bearing assembly 16 is mounted on the inner periphery of the hub section 2 inboard of the backing plate 12. This ball bearing assembly 16 comprises an outer race 14a, an inner race 14, a ball bearing cage 15 and rolling element 15a. A seal 17 is provided on the inner periphery of the ball bearing assembly 16. A seal 18 is provided on the outer periphery of the ball bearing assembly 16 and the inner periphery of the hub 2. An internal seal is provided at 19 between the outer race 14a and the inner race 14. The inboard side of the ball bearing assembly 16 abuts the housing 11 and also a retainer ring 20 which is mounted on the inboard edge of hub 2.

The housing 11 is connected to a shaft housing extension 21 by means of bolts 22. This housing extension 21 extends inward to the differential of the vehicle. Within the housing extension 21 is mounted the parking brake actuating means. A sleeve member 23 is placed about the drive shaft 7 and extends from a point within the housing extension 21 to the outboard side of the pressure plate 13. This sleeve member 23 has a radial flange 23a on its outboard end which actuates the disk stack when the sleeve is moved axially inward. The inboard end of this sleeve receives a snap ring 24 in a groove about its outer periphery. This snap ring 24 abuts the inboard side of the annular wheel piston 25. A seal 26 is provided between the inboard end of the annular fluid piston 25 and the internal periphery of the housing extension 21. The outboard side of the wheel piston 25 is provided with two seals 27 and 28 which provide a pressure chamber for actuating of the disk brake. An inlet fluid passage 29 is provided for the actuating fluid. This passage is connected to a duct 30 which extends to the master cylinder which is operated by the brake pedal 31.

About the outer periphery of the annular piston 25 is cut a helical ball groove. This groove has a mating section on the ball groove nut 32. This groove receives spherical balls which move the annular piston axially in relation to the ball groove nut 32 as the ball groove nut is rotated. The ball groove nut 32 is provided with an annular groove 33 for receiving spherical balls 34. These balls fit into a mating groove 35 which is on the inboard side of the shaft housing 11.

The shaft housing 11 is held in non-rotative alignment with the annular wheel piston 25 by means of alignment dowels 36. These dowels 36 are spaced at intervals around the radial flange of housing 11 within the fluid operating chamber extending into the anular fluid piston.

The shaft housing extension 21 has a ball bearing assembly 37 inserted within its inner periphery for receiving the shaft member 7. A seal 38 is provided on the ball bearing assembly's outer periphery and a seal 39 is disposed on the inner periphery of the bearing assembly. A fluid seal 40 is provided between the inner and outer races of the ball bearing assembly 37. This ball bearing assembly abuts a radial flange portion on the inner periphery of the shaft housing extensions 21. A return spring 41 is placed between the ball bearing assembly 37 and the annular piston 25.

The means for providing the proper clearance between the rotating and stationary disks is shown in FIG. 1. The screw member 42 is threadedly engaged in the shaft housing 11. The shoulder portion 43 abuts against the radial flange of the inboard side of the housing extension 11. The distance between this shoulder 43 and the head 44 of the screw member 42 is a predetermined length. The sleeve member 45 is placed on the screw member 42 prior to assembling. The difference in length of the sleeve member 45 and the distance between the shoulder 43 and the head 44 is the predetermined clearance to be provided between the braking disks. The sleeve 45 has a close fitting tolerance on the inner periphery of the hole 46 of the fluid piston 25 in which it is inserted.

FIG. 2 is a cross-section view showing the end portion of the parking brake actuating means. The housing extension 21 is mounted concentrically around the ball groove nut 32. The extension housing 21 is also shown extending within the ball groove nut 32. A coil spring 50 is located concentrically within these two portions of the shaft housing extension 21. The one end of spring 50 has a radialy extending portion 51 which engages a portion of the ball groove nut 32. The opposite end of this coil spring extends axially outboard into the annular wheel piston 25. This end of the spring 52 is shown inserted in a hole of the annular piston 25 by FIG. 6.

The actuating sleeve 23 is shown concentrically mounted about the wheel shaft 7. The cable 53 is connected to axially extending flanges 54 and 55. The cable 53 is wound around the flange 54 and then doubled back between the two similarly shaped flanges on the ball groove nut 32. This cable wraps around the outer periphery of the ball groove nut 32 and extends outward through a cable fitting of the shaft housing extension 21.

The cable fitting comprises a sleeve 56 which is inserted in the shaft housing extension 21. Within the inner periphery of the sleeve 56 is mounted a cable guide 57 which has a seal member 58 about its outer periphery and the inner periphery of the sleeve 56. The cable guide 57 is held in position by means of a threaded sleeve which engages the inner periphery of the outer end of sleeve 56. The cable 53 extends into an armoured portion 59 on the outer side of the cable fitting. About the outer periphery of the armoured portion 59 a spring is provided which is also shown at 60.

FIG. 3 is a cross-section view of the cable actuated parking brake mechanism. This view illustrates the mounting of the spherical balls 61 within the mating ball grooves. A pin 62 is mounted on the hydraulic piston 25 adjacent the end of the spherical balls 61. The pin 63 is mounted in the ball groove nut 32 adjacent the spring 64. This spring extends from the pin 63 in the annular ball groove to the adjacent end of the spherical balls 61. The mounting of the pin 62 is also shown in FIG. 4. The groove 33 in the ball groove nut 32 is also shown in FIG. 4. This groove receives the spherical ball 34.

FIG. 7 is a modified version of the parking brake actuating mechanism. The hub or wheel mounting flange is shown at 70 as an integral part of the shaft 71. The shaft 71 is rotatably mounted within the brake housing 72 which receives the ball bearing assembly 73. The ball bearing assembly 73 is retained in position by the annular flange member 74 which is held in place by the bolts 75. A seal member 76 is placed on the outer periphery of the ball bearing assembly 73. A second seal 77 is also placed on the inner periphery of the ball bearing assembly 73. The brake housing 72 is mounted adjacent to the wheel cylinder 78 and held in position by bolts 79. A seal 80 is provided between the brake housing 72 and wheel cylinder 78. On the inboard side of the wheel cylinder 78, a shaft housing 81 is bolted by means of bolts 82. The ball bearing assembly 83 is inserted within shaft housing 81. A seal member 84 is placed between the shaft 71 and the ball bearing assembly 83. A seal 85 is placed between the shaft housing 81 and the ball bearing assembly 83. A seal 86 is also placed between the inner and outer races of the ball bearing assembly 83.

The modification of the brake assembly employs an annular piston which moves axially outboard to actuate the brakes. The brake housing 72 operates as the pressure plate for the disk stack. The rotating disks 87 are mounted on a spline portion of shaft 71. These rotating disks 87 are provided with a friction material for engaging the stator disks 88. The stator disks 88 are mounted on pins 89 which fit into aligned holes in the brake housing 72 and the wheel cylinder 78. A seal 90 is provided between the brake housing 72 and the wheel cylinder 78. The fluid actuating chamber for the hydraulic annular piston is shown at 91. The seal 92 at the outboard end and the seal 93 at the inboard end confine the fluid within the actuating chamber 91.

The annular piston 191 is held in a nonrotating position by means of the pin 89. These pins 89 are spaced about the outboard side of the wheel cylinder 78. Alternately spaced between these pins 89 are the clearance adjusting devices. These devices comprise pins 94 which are mounted in closely fitted holes in the radially outer portion of the annular piston 191. As the braking disks become worn, the annular piston 191 is permitted to move a greater distance outboard and the pins 94 are moved within the annular piston. The movement of the pins 94 is in a direct relation to the wear of the brake disks. The annular piston 191 is returned to its normal position upon release of the brakes by the return springs 95. The inboard end of the pins 94 determine the retracted position of the piston 191.

The annular piston has a helical ball groove about its inner periphery on the inboard end. A ball groove nut 96 has a mating ball groove about its outer periphery on its outboard end. Spherical balls 97 are placed within the mating portions of the ball groove portion of the fluid piston and the ball groove portion of the nut 96. As the ball groove nut 96 is rotated, a pressure is created on the groove 98 on the inboard side of nut 96. The groove 98 has a mating portion on the annular shoulder member 99 for receiving spherical balls 100. Upon rotation of the ball groove nut 96 the annular piston is moved axially outboard by the force created on the spherical balls 97 within their helical groove. The outboard axial movement of the piston 191 creates engagement of the braking disks.

FIGURE 8 illustrates a cross-section portion of the parking brake actuating means. The wheel cylinder 78 with its attaching bolts 79 is shown around the outer periphery of the rotating portion of the brake mechanism. The wheel cylinder 78 encloses the rotating mechanism and provides a seating portion for the annular shoulder member 99 with an annular groove for receiving the balls 100. The spherical balls 100 are placed between the ball groove nut 96 and the annular shoulder 99. The annular shoulder member 99 is in a non-rotating position on the wheel cylinder 78. The ball groove nut 96 is rotatably mounted on the spherical balls 97. The cable 105 extends inward within the housing and is attached to a ball 106 which is fitted into a slot 107 in the ball groove nut 96. The cable 105 extends outward from the housing portion through a cable guide 108.

The cable guide 108 is fixed in position by means of a pin 109 and is provided with a seal 110 on its inner end. The outer end of the cable guide is received within an extended portion of the cable guide 111 which carries an armored portion 112 about its inner periphery. The cable 105 extends outwardly where it is attached to a handle member 113 which is used for actuating the parking braking mechanism. The handle member 113 is provided with a ratchet portion 114 which engages the pawl 115 which locks the ratchet arm 114 upon actuation of the braking mechanism.

FIGS. 9, 10, and 11 illustrate a modification of the parking brake mechanism. FIG. 9 is taken through the center line of the wheel shaft in a vertical plane. The wheel cylinder 116 is shown connected to the shaft housing 117 by means of bolts 118 and washers 119. A seal 120 is shown between the wheel cylinder 116 and shaft housing 117. The shaft 121 is rotatably mounted within the ball bearing assembly 122 which is mounted on the inner periphery of the shaft housing 117. A fluid seal assembly 124 is mounted adjacent the ball bearing assembly. The annular wheel piston 125 is mounted within the wheel cylinder 116. A needle bearing assembly 126 is mounted axially inboard from the annular piston 125. This needle bearing assembly 126 is mounted adjacent the ball groove nut 127 which has a helical ball groove on its inner periphery. A ball groove sleeve 128 is mounted within the inner periphery of the ball groove nut 127 and has a mating helical ball groove on its outer periphery. Spherical balls 129 are retained within the mating portion of the helical ball groove nut 127 and ball groove sleeve 128.

A cable 130 is wrapped around the outer periphery of the ball groove nut 127. On the inboard side of the ball groove nut 127 is mounted a resilient spring 132 for returning the brake actuating means after the mechanism has been released. A pin 131 is mounted within housing 116 and functions as a stop means which abuts against the one end of the return spring 132 mounted within the housing 116 and abutting the pin 131. The spring 132 extends about the inner periphery of the housing 116 to where it abuts two pins 133 and 134 at the opposite end of spring 132. It will be noted that the flange portion 135 which is a portion of the ball groove nut 127 is shown abutting this spring 132. This view shows the braking mechanism in the return position. This flange portion 135 is also illustrated in FIG. 9 as a portion of the ball groove nut 127. FIG. 11 also shows a portion of the annular hydraulic piston 125 which is concentrically mounted around the shaft 121.

The attaching means for the cable 130 are illustrated in FIG. 10. A portion 136 of the ball groove nut 127 extends radially outward from the ball groove nut. The cable 130 extends tangentially around the ball groove nut and through the portion 136 where it is attached to a ball 137 which locks the cable in position. As the outer portion of the cable is pulled, the ball 137 creates a pressure against the radial flange 136 and thereby rotates the ball groove nut 127.

This cable is also provided with a guide means on its outer end. This guide means is generally of the same structure previously described. The ball groove nut is shown rotatably mounted on the spherical balls 129. These balls are mounted on a helical mating groove on the internal groove sleeve 128. The shaft 121 is shown concentrically mounted within the ball groove sleeve 128. The operation and assembly of this ball groove sleeve is of the general structure previously described in the preceding paragraphs of the other modifications.

The parking brake actuating mechanism operates in this manner: Referring to views 1 and 2, as the cable 53 is pulled outward for the actuation of the brakes, the ball groove nut 32 is rotated. The annular piston 25 which is mounted concentrically within ball groove nut 32 has mating ball grooves for receiving the spherical balls 61. As the ball groove nut is rotated in relation to the hydraulic piston 25, the hydraulic piston moves axially inboard. This axially inboard movement of the hydraulic piston 25 continues until the flange portion 23a of sleeve 23 compresses the pressure plate 13 against the brake disk stack. As the brake disks 9 and 10 frictionally engage each other, the rotation of the vehicle wheel 1 is retarded.

The force on the flange 23a on the wheel portion 25 creates a reaction force through the spherical balls 61 onto the ball groove nut 32. This force is transmitted through the spherical balls 34 and transmitted to the shaft housing 11.

This brake has the added feature of being assisted by the hydraulic system for actuating the brakes. This feature is an advantage in event that the brake disks are hot from constant use. The heat within the braking structure causes an expansion of the brake disks which may cause a release of the brakes if they are not actuated firmly. This brake, having a high mechanical advantage in the screw arrangement of the ball groove nut, would not generally necessitate the use of the hydraulic fluid system, but in event that the operator should desire to use this assisting force, the actuating of the wheel cylinder is in the same direction in cooperation with the hand operating means.

The brake actuation by the foot pedal 31 displaces fluid within the master cylinder 30a which creates a pressurized fluid within the actuating chamber of the housing 11 and piston 25.

Upon release of the brakes either by the hydraulic actuating means or the manual parking brake mechanism, the return spring 41 returns the piston 25 to its retracted position.

The brake actuating mechanism has a built-in clearance adjustment for the brake disks. This adjustment is provided for in this manner: A screw member 42 is mounted concentrically within sleeve member 45 on the radial flange of the housing member 11. These screws are angularly spaced about the radial flange on a common radial circle of the housing member 11. The sleeve member 45 is snugly fitted within the reamed hole of the hydraulic wheel piston 25. The screw 42 is screwed snugly against the flange portion of the housing member 11 with the shoulder 43 abutting the flange portion of housing 11. The predetermined clearance which is to be provided between the brake disks is equal to the difference in length of the distance from the shoulder portion 43 to the head 44 of screws 42 and the length of sleeve 45.

As the hydraulic annular piston 25 is actuated, the piston 25 moves inboard carrying the sleeve 45. If excessive clearance exists between the brake disks, the sleeve 45 will abut the head 44 and the head will slide sleeve 45 axially outboard in the annular hydraulic piston 25. As the brakes are released, the annular piston moves outboard carrying the sleeve 45 to a new position. The annular piston 25 does not completely return to its original position, but only to the point where the outboard edge of the sleeve 45 abuts the radial flange portion of the housing 11. By this means, a constant clearance is provided between the braking disks. This means that the annular cylinder will move a constant distance for brake actuation whether it be by the hydraulic fluid system or the parking brake actuation means.

The version illustrated in FIG. 7 operates in the same manner as the original version of this brake actuating means, except the hydraulic wheel piston 191 and the ball groove nut 96 elongate, and the ball groove nut forces against the annular member 99 into the spherical balls 100. A torsion spring 51 is provided for returning the ball groove nut to its original position.

The modification illustrated in views 9, 10 and 11 operates on the ball groove principal with a ball groove nut and ball groove sleeve except a needle bearing assembly 126 is placed between the ball groove nut 127 and the hydraulic wheel piston 125. The return means for the parking brake actuating mechanism utilizes the compression coil spring instead of the torsion-type spring, which is mounted concentrically around the wheel shaft.

While the embodiment of the present invention as herein disclosed constitutes a preferred form, it is to be understood that other forms might be adopted.

What is claimed is as follows:

1. A parking brake actuating mechanism comprising in combination, a housing means, a shaft means rotatably mounted within said housing means, a wheel attached to said shaft means, one or more rotating disks mounted on said shaft means, stator disks mounted on said housing means, an annular hydraulic wheel cylinder for frictionally engaging said braking disks with each other by pressurized fluid in said braking system, a ball groove nut mounted concentrically with said annular hydraulic cylinder, a helical ball groove on said hydraulic wheel cylinder and a mating helical ball groove on said ball groove nut for reception of spherical balls, a cable connected to said ball groove nut for rotating said ball groove nut in relation to said hydraulic wheel cylinder and thereby providing relative axial movement and actuation of said brake disk, a torsion spring for returning said ball groove nut to its normal position, alignment pins for aligning the hydraulic wheel cylinder in a non-rotating position in relation to said housing means, clearance adjusting pins alternately spaced in said wheel cylinder, return springs mounted on said adjusting pins, said adjusting pins being of a predetermined shorter length than the spaced portion within the housing means which they are located, said difference in length of the pins and the spaced portion in the housing means being the predetermined clearance to be provided between the braking disks, said space automatically adjusted upon actuation of said wheel cylinder during the actuation of said brakes.

2. A parking brake actuating means comprising in combination, a housing means, a shaft means rotatably mounted within said housing means, a wheel connected to said shaft, one or more rotator disks connected to said shaft means, one or more stator disks connected to said housing means, an annular hydraulic wheel cylinder for frictionally engaging said stator disks with said rotator disks, a ball groove nut mounted concentrically with said annular hydraulic wheel cylinder, helical ball grooves on said annular wheel cylinder and helical mating ball grooves on said ball groove nut for reception of spherical balls for transmission of an axial force from said ball groove nut to said annular hydraulic wheel cylinder when said members are rotated in relation to each other, alignment pins mounted in said housing means for retaining non-rotative alignment between said housing means and said annular hydraulic cylinder, adjusting pins abutting the housing means and mounted with a closely fitted tolerance in said annular hydraulic cylinder with return springs concentrically mounted about said adjusting pins, said adjusting pins of a predetermined shorter length than the spaced portion within said housing means which they are located, said predetermined shorter length being the spaced clearance between said rotator and stator disks, said clearance adjustment being automatically maintained as said wheel cylinder is operated for the actuation of said brakes.

3. A parking brake actuating mechanism comprising in combination, a housing means, a shaft means rotatably mounted within said housing means, a wheel connected to said shaft means, one or more rotating disks connected to said shaft means, one or more stator disks connected to said housing means, a hydraulic annular cylinder mounted within said housing means having a hydraulic chamber for frictionally engaging of said brake disks, a ball groove nut concentrically mounted with said annular hydraulic cylinder, a helical ball groove on said annular hydraulic cylinder and a mating helical ball groove on said ball groove nut for reception of spherical balls for transmission of an axial force from said ball groove nut to said annular hydraulic cylinder when said members are rotated in relation to each other, a cable means for rotating said ball groove nut and a means for pressurizing fluid in said fluid chamber of said hydraulic cylinder, thereby providing two simultaneous means for actuating said braking means, alignment pins mounted in said housing member for maintaining said hydraulic wheel cylinder in a non-rotative position in relation to said housing means, adjusting pins mounted in said hydraulic wheel cylinder with a closely fitted tolerance, return springs concentrically mounted around said adjusting pins, said adjusting pins being of a predetermined shorter length than the space within said housing means in which they are located, said predetermined shorter length being equal to the clearance provided between said rotator and stator disks, said clearance being adjusted as said hydraulic cylinder is actuated and said adjusting pin moves axially within said hydraulic wheel cylinder.

References Cited in the file of this patent
UNITED STATES PATENTS

| | | |
|---|---|---|
| 1,791,685 | Rockwell et al. | Feb. 10, 1931 |
| 2,014,630 | O'Brien et al. | Sept. 17, 1935 |
| 2,091,268 | Colman | Aug. 31, 1937 |
| 2,115,661 | Zima | Apr. 26, 1938 |
| 2,384,297 | Goepfrich | Sept. 4, 1945 |
| 2,914,142 | Klaue | Nov. 24, 1959 |